United States Patent
Quinn et al.

(10) Patent No.: US 11,379,328 B2
(45) Date of Patent: Jul. 5, 2022

(54) TRANSITIONING FROM A DONOR FOUR SITE DATA REPLICATION SYSTEM TO A TARGET FOUR SITE DATA REPLICATION SYSTEM

(71) Applicant: EMC IP Holding Company LLC, Hopkinton, MA (US)

(72) Inventors: Brett A. Quinn, Lincoln, RI (US); Paul A. Linstead, Shrewsbury, MA (US); Douglas E. LeCrone, Hopkinton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 102 days.

(21) Appl. No.: 17/037,086

(22) Filed: Sep. 29, 2020

(65) Prior Publication Data

US 2022/0100620 A1    Mar. 31, 2022

(51) Int. Cl.
*G06F 11/00*    (2006.01)
*G06F 11/20*    (2006.01)
*G06F 13/16*    (2006.01)

(52) U.S. Cl.
CPC ...... *G06F 11/2094* (2013.01); *G06F 11/2058* (2013.01); *G06F 11/2069* (2013.01); *G06F 11/2071* (2013.01); *G06F 13/1668* (2013.01); *G06F 2201/82* (2013.01)

(58) Field of Classification Search
CPC ............ G06F 11/2058; G06F 11/2069; G06F 11/2071; G06F 11/203; G06F 3/0647; G06F 3/065
See application file for complete search history.

(56) References Cited

U.S. PATENT DOCUMENTS

| | | | |
|---|---|---|---|
| 5,206,939 A | 4/1993 | Yanai et al. | |
| 5,778,394 A | 7/1998 | Galtzur et al. | |
| 5,845,147 A | 12/1998 | Vishlitzky et al. | |
| 5,857,208 A | 1/1999 | Ofek | |
| 7,054,883 B2 | 5/2006 | Meiri et al. | |
| 8,700,570 B1 * | 4/2014 | Marathe | G06F 16/1824 707/634 |
| 8,903,766 B2 * | 12/2014 | Padovano | G06F 11/2069 707/610 |
| 9,811,272 B1 | 11/2017 | LeCrone et al. | |
| 2016/0357648 A1 * | 12/2016 | Keremane | G06F 11/2069 |

* cited by examiner

*Primary Examiner* — Marc Duncan
(74) *Attorney, Agent, or Firm* — Muirhead and Saturnelli, LLC

(57) ABSTRACT

Transitioning from using a donor four site replication system to using a target four site replication system includes initiating synchronization between a first local storage system of the donor four site replication system that receives I/O from a host with an alternative first local storage system of the target four site replication system, the host switching to automatically fail over to a synchronous storage system of the target four site replication system that receives synchronous data from the alternative first local storage system following synchronizing the first local storage system with the alternative first local storage system, and the host switching to perform I/O operations with the alternative first local storage system following switching to automatically fail over to the synchronous storage system. The host may run the z/OS operating system. The host may automatically fail over to a storage system by switching subchannel sets.

20 Claims, 7 Drawing Sheets

TRANSITIONING FROM A DONOR FOUR SITE DATA REPLICATION SYSTEM TO A TARGET FOUR SITE DATA REPLICATION SYSTEM

BACKGROUND OF THE INVENTION

1. Technical Field

This application relates to computer storage systems, and more particularly to the field of transferring data between storage systems.

2. Description of Related Art

Host processor systems may store and retrieve data using a storage system containing a plurality of host interface units (host adapters), physical storage units, and disk interface units (disk adapters). Such storage systems are provided, for example, by Dell EMC of Hopkinton, Mass. and disclosed, for example, in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek, all of which are incorporated herein by reference. The host systems access the storage system through a plurality of channels provided therewith. Host systems provide data and access control information through the channels to the storage system and the storage system provides data to the host systems also through the channels. The host systems do not address the physical storage units of the storage system directly, but rather, access what appears to the host systems as a plurality of logical units (volumes). The logical units may or may not correspond to the physical storage units. Allowing multiple host systems to access the single storage system unit allows the host systems to share data stored therein.

In some instances, it may be desirable to maintain operation and data accesses even if a storage system fails. Failover to local synchronous storage systems and/or remote systems is described in U.S. Pat. No. 9,811,272 to Lecrone, et al. and titled "FOUR SITE DATA REPLICATION USING HOST BASED ACTIVE/ACTIVE MODEL" (the '272 patent), which is incorporated by reference herein. The '272 patent teaches a four site replication system which includes both failover to a local storage system and failover to a remote storage system that is geographically distant from the local storage system (e.g., west coast of United States vs. east coast of United States).

In some cases, it may be desirable to replace components of a four site replication system. One possibility is to suspend a host that is accessing the four site replication system, copy data from the old four site replication system (donor system) to the new four site replication system (target system), and then resume host operations. Although this may be acceptable in some situations, in many cases it may not be desirable to suspend the host for any amount of time. Moreover, it may be important to maintain the protection during the transition against failure of a storage system afforded by four site replication.

Accordingly, it is desirable to be able to transition from a donor four site replication system to a target four site replication system without needing to suspend operations of the host or to forgo during the transition the protections afforded by the four site replication system.

SUMMARY OF THE INVENTION

According to the system described herein, transitioning from using a donor four site replication system to using a target four site replication system includes initiating synchronization between a first local storage system of the donor four site replication system that receives I/O from a host with an alternative first local storage system of the target four site replication system, the host switching to automatically fail over to a synchronous storage system of the target four site replication system that receives synchronous data from the alternative first local storage system following synchronizing the first local storage system with the alternative first local storage system, and the host switching to perform I/O operations with the alternative first local storage system following switching to automatically fail over to the synchronous storage system. The host may run the z/OS operating system. The host may automatically fail over to a storage system by switching subchannel sets. The host may switch to perform I/O operations with the alternative first local storage system by switching subchannel sets. Prior to the host switching to automatically fail over to the synchronous storage system, the host may be configured to automatically fail over to a second local storage system of the donor target replication system. The second local storage system may receive synchronous data from the first local storage system. A first remote storage system may receive asynchronous data from the first local storage system and a second remote storage system may receive asynchronous data from the second local storage system. An alternative first remote storage system receives asynchronous data from the alternative first local storage system. Asynchronous data may be provided using an SRDF/A protocol.

According further to the system described herein, a non-transitory computer readable medium contains software that transitions from using a donor four site replication system to using a target four site replication system. The software includes executable code that initiates synchronization between a first local storage system of the donor four site replication system that receives I/O from a host with an alternative first local storage system of the target four site replication system, executable code that switches the host to automatically fail over to a synchronous storage system of the target four site replication system that receives synchronous data from the alternative first local storage system following synchronizing the first local storage system with the alternative first local storage system, and executable code that switches the host to perform I/O operations with the alternative first local storage system following switching to automatically fail over to the synchronous storage system. The host may run the z/OS operating system. The host may automatically fail over to a storage system by switching subchannel sets. The host may switch to perform I/O operations with the alternative first local storage system by switching subchannel sets. Prior to the host switching to automatically fail over to the synchronous storage system, the host may be configured to automatically fail over to a second local storage system of the donor target replication system. The second local storage system may receive synchronous data from the first local storage system. A first remote storage system may receive asynchronous data from the first local storage system and a second remote storage system may receive asynchronous data from the second local storage system. An alternative first remote storage system receives asynchronous data from the alternative first local storage system. Asynchronous data may be provided using an SRDF/A protocol.

BRIEF DESCRIPTION OF DRAWINGS

Embodiments of the system are described with reference to the several figures of the drawings, noted as follows.

DETAILED DESCRIPTION OF VARIOUS EMBODIMENTS

The system described herein transitions from a donor four site replication system to a target four site replication system without needing to suspend operation of the host or forgo at any time the protections afforded by the four site replication system. Data from a local storage device of the donor four site replication system is first replicated to an alternative local storage device of the target four site replication system. Following replication, a mechanism is used at the host to switch storage systems that are accessed by the host without affecting any applications running on the host. The mechanism may switch subchannel sets used by the host to access storage systems.

Figure 1:
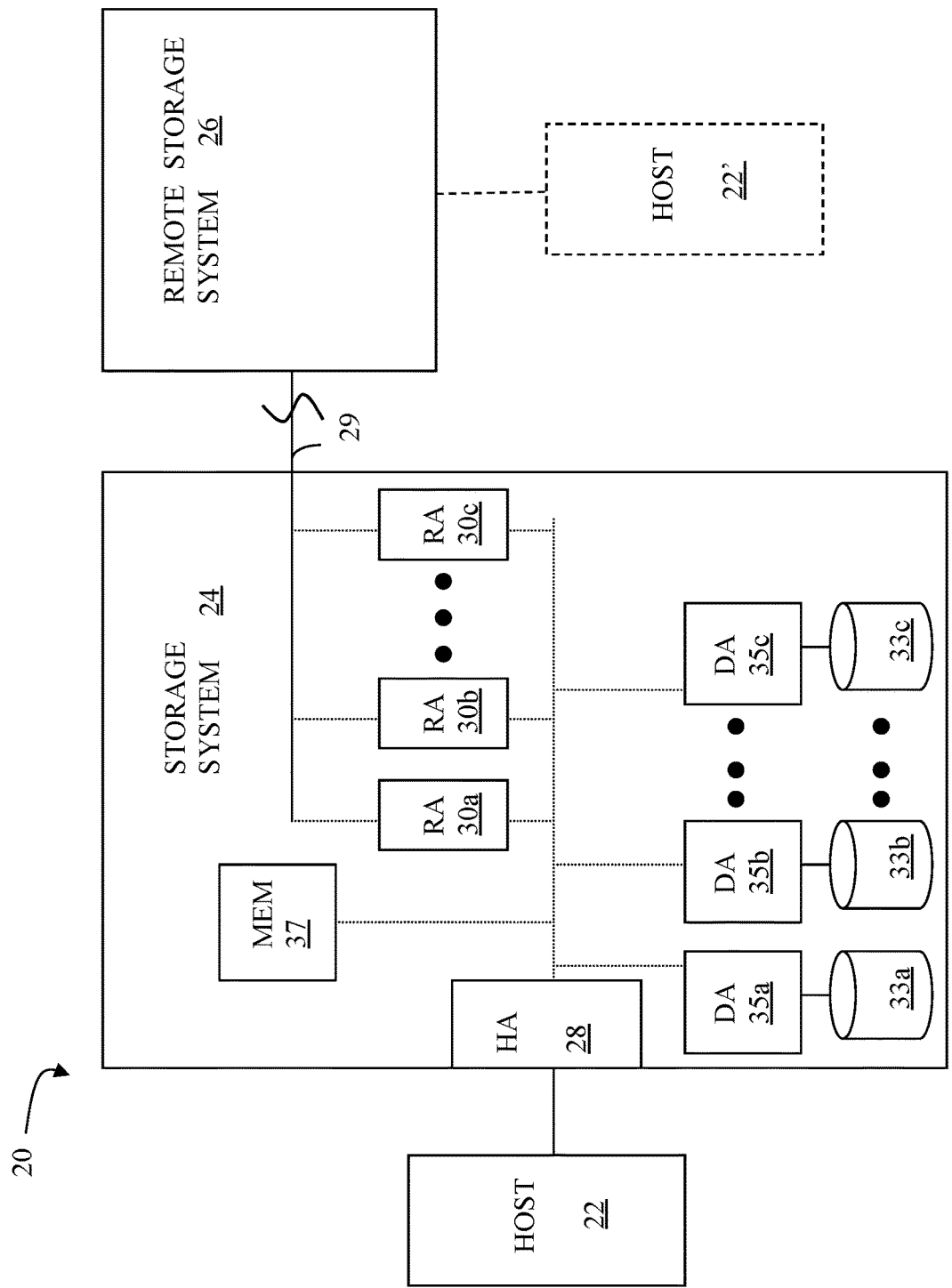
FIG. 1 is a schematic illustration of a storage system showing a relationship between a host, a local storage system, and a remote storage system that may be used in connection with an embodiment of the system described herein.

FIG. 1 is a diagram 20 showing a relationship between a host 22 and a storage system 24 that may be used in connection with an embodiment of the system described herein. In an embodiment, the storage system 24 may be a PowerMax, Symmetrix, or VMAX storage system produced by Dell EMC of Hopkinton, Mass.; however, the system described herein may operate with other appropriate types of storage systems. Also illustrated is another (remote) storage system 26 that may be similar to, or different from, the storage system 24 and may, in various embodiments, be coupled to the storage system 24, using, for example, a network. The host 22 reads and writes data from and to the storage system 24 via an HA 28 (host adapter), which facilitates an interface between the host 22 and the storage system 24. Although the diagram 20 shows the host 22 and the HA 28, it will be appreciated by one of ordinary skill in the art that multiple host adaptors (possibly of different configurations) may be used and that one or more HAs may have one or more hosts coupled thereto.

In an embodiment of the system described herein, in various operations and scenarios, data from the storage system 24 may be copied to the remote storage system 26 via a link 29. For example, transferring data may be part of a data mirroring or replication process that causes data on the remote storage system 26 to be identical to the data on the storage system 24. Although only the one link 29 is shown, it is possible to have additional links between the storage systems 24, 26 and to have links between one or both of the storage systems 24, 26 and other storage systems (not shown). The storage system 24 may include a first plurality of remote adapter units (RA's) 30a, 30b, 30c. The RA's 30a-30c may be coupled to the link 29 and be similar to the HA 28, but are used to transfer data between the storage systems 24, 26.

The storage system 24 may include one or more physical storage units (including disks, solid state storage devices, etc.), each containing a different portion of data stored on the storage system 24. FIG. 1 shows the storage system 24 having a plurality of physical storage units 33a-33c. The physical storage units 33a-33c may be non-volatile. The storage system 24 (and/or remote storage system 26) may be provided as a stand-alone device coupled to the host 22 as shown in FIG. 1 or, alternatively, the storage system 24 (and/or remote storage system 26) may be part of a storage area network (SAN) that includes a plurality of other storage systems as well as routers, network connections, etc. (not shown in FIG. 1). The storage systems may be coupled to a SAN fabric and/or be part of a SAN fabric. The system described herein may be implemented using software, hardware, and/or a combination of software and hardware where software may be stored in a computer readable medium and executed by one or more processors.

Each of the physical storage units 33a-33c may be coupled to a corresponding disk adapter unit (DA) 35a-35c that provides data to a corresponding one of the physical storage units 33a-33c and receives data from a corresponding one of the physical storage units 33a-33c. An internal data path exists between the DA's 35a-35c, the HA 28 and the RA's 30a-30c of the storage system 24. Note that, in other embodiments, it is possible for more than one physical storage unit to be serviced by a DA and that it is possible for more than one DA to service a physical storage unit. The storage system 24 may also include a global memory 37 that may be used to facilitate data transferred between the DA's 35a-35c, the HA 28 and the RA's 30a-30c as well as facilitate other operations. The memory 37 may contain task indicators that indicate tasks to be performed by one or more of the DA's 35a-35c, the HA 28 and/or the RA's 30a-30c, and may contain a cache for data fetched from one or more of the physical storage units 33a-33c.

The storage space in the storage system 24 that corresponds to the physical storage units 33a-33c may be subdivided into a plurality of volumes or logical devices (LUNs). The LUNs may or may not correspond to the storage space of the physical storage units 33a-33c. Thus, for example, the physical storage unit 33a may contain a plurality of LUNs or, alternatively, a single LUN could span both of the physical storage units 33a, 33b. Similarly, the storage space for the remote storage system 26 may be subdivided into a plurality of volumes or LUNs, where each of the LUNs may or may not correspond to one or more physical storage units of the remote storage system 26. In some embodiments, an other host 22' may be provided. The other host 22' is coupled to the remote storage system 26 and may be used for disaster recovery so that, upon failure at a site containing the host 22 and the storage system 24, operation may resume at a remote site containing the remote storage system 26 and the other host 22'. In some cases, the host 22 may be directly coupled to the remote storage system 26, thus protecting from failure of the storage system 24 without necessarily protecting from failure of the host 22. The storage systems 24, 26 may be part a virtualization system and may store virtual volumes that are accessed by virtual machines. The virtualization system may use vSphere APIs for Storage Awareness (VASA) to permit the storage systems 24, 26 to integrate with the virtualization system. One or both of the hosts 22, 22' may be virtual machines. In other embodiments, it is possible for the storage systems 24, 26 to be accessed by physical computing systems and to not contain any virtual volumes.

It is possible to mirror data between the storage systems 24, 26 using an RDF (Remote Data Facility) mapping. Providing an RDF mapping between the local storage system 24 and the remote storage system 26 involves setting up a LUN on the remote storage system 26 that is a remote mirror for a LUN on the local storage system 24. The host 22 reads and writes data from and to the LUN on the local storage system 24 and the RDF mapping causes modified data to be transferred from the local storage system 24 to the remote storage system 26 using the RA's, 30a-30c, 32a-32c and the RDF link 29. In steady state operation, the LUN on the remote storage system 26 contains data that is identical to the data of the LUN on the local storage system 24. The LUN on the local storage system 24 that is accessed by the host 22 is referred to as the "R1 volume" (or just "R1") while the LUN on the remote storage system 26 that contains a copy of the data on the R1 volume is called the "R2 volume" (or just "R2"). Thus, the host reads and writes data from and to the R1 volume and RDF handles automatic copying and updating of the data from the R1 volume to the R2 volume.

Figure 2:
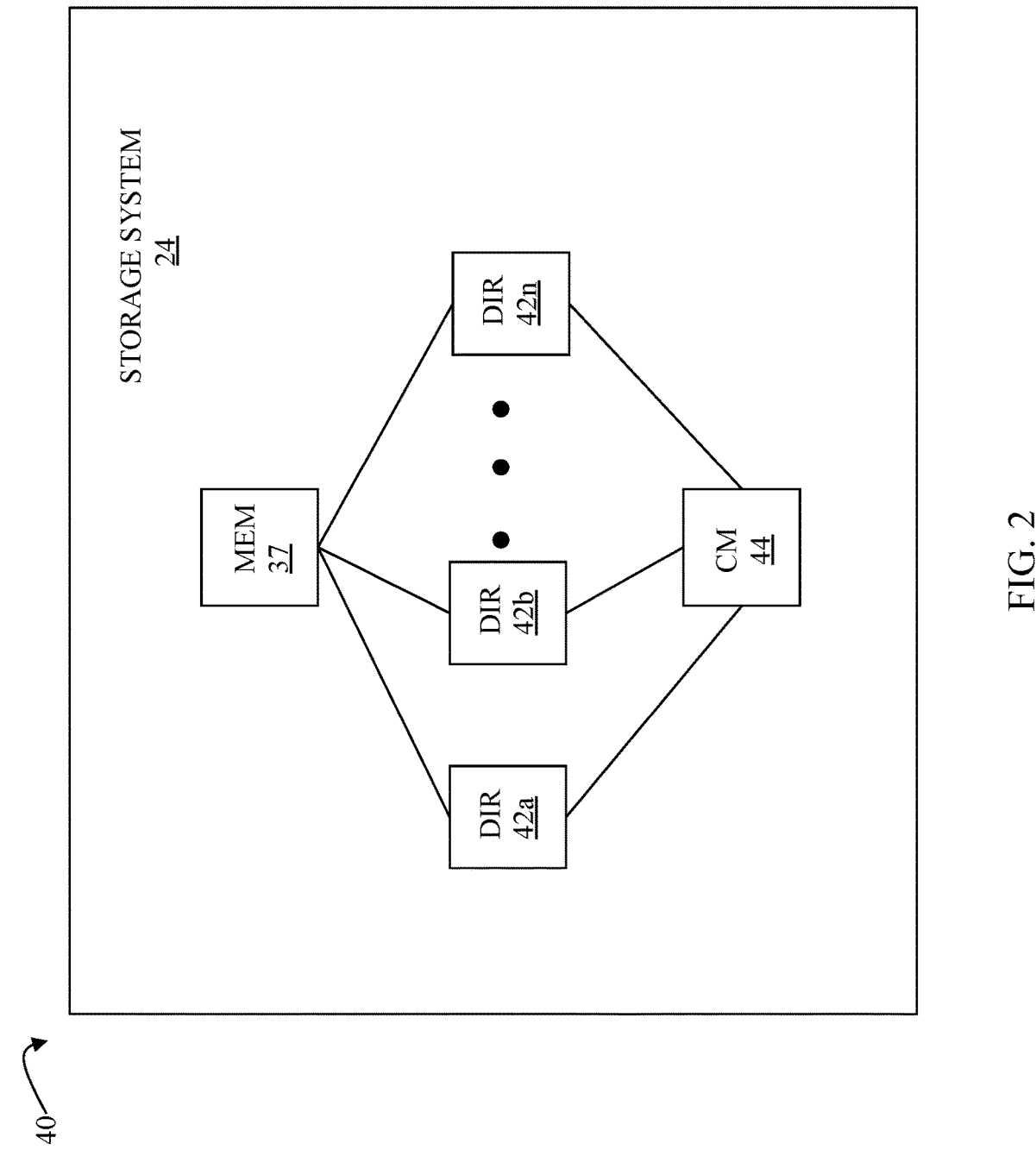
FIG. 2 is a schematic diagram illustrating a storage system where each of a plurality of directors are coupled to a memory according to an embodiment of the system described herein.

FIG. 2 is a schematic diagram 40 illustrating an embodiment of the storage system 24 where each of a plurality of directors 42a-42n are coupled to the memory 37. Each of the directors 42a-42n represents at least one of the HA 28, RAs 30a-30c, or DAs 35a-35c. The diagram 40 also shows an optional communication module (CM) 44 that provides an alternative communication path between the directors 42a-42n. Each of the directors 42a-42n may be coupled to the CM 44 so that any one of the directors 42a-42n may send a message and/or data to any other one of the directors 42a-42n without needing to go through the memory 37. The CM 44 may be implemented using conventional MUX/router technology where one of the directors 42a-42n that is sending data provides an appropriate address to cause a message and/or data to be received by an intended one of the directors 42a-42n that is receiving the data. Some or all of the functionality of the CM 44 may be implemented using one or more of the directors 42a-42n so that, for example, the directors 42a-42n may be interconnected directly with the interconnection functionality being provided on each of the directors 42a-42n. In addition, one or more of the directors 42a-42n may be able to broadcast a message to all or at least some plurality of the other directors 42a-42n at the same time.

In some embodiments, one or more of the directors 42a-42n may have multiple processor systems thereon and thus may be able to perform functions for multiple discrete directors. In some embodiments, at least one of the directors 42a-42n having multiple processor systems thereon may simultaneously perform the functions of at least two different types of directors (e.g., an HA and a DA or an HA and an RA). Furthermore, in some embodiments, at least one of the directors 42a-42n having multiple processor systems thereon may simultaneously perform the functions of at least one type of director and perform other processing with the other processing system. In addition, all or at least part of the global memory 37 may be provided on one or more of the directors 42a-42n and shared with other ones of the directors 42a-42n. In an embodiment, the features discussed in connection with the storage system 24 may be provided as one or more director boards having CPUs, memory (e.g., DRAM, etc.) and interfaces with Input/Output (I/O) modules.

Note that, although specific storage system configurations are disclosed in connection with FIGS. 1 and 2, it should be understood that the system described herein may be implemented on any appropriate platform. Thus, the system described herein may be implemented using a platform like that described in connection with FIGS. 1 and 2 or may be implemented using a platform that is somewhat or even completely different from any particular platform described herein.

A storage area network (SAN) may be used to couple one or more host systems with one or more storage systems in a manner that allows reconfiguring connections without having to physically disconnect and reconnect cables from and to ports of the devices. A storage area network may be implemented using one or more switches to which the storage systems and the host systems are coupled. The switches may be programmed to allow connections between specific ports of devices coupled to the switches. A port that can initiate a data-path connection may be called an "initiator" port while the other port may be deemed a "target" port.

Figure 3:
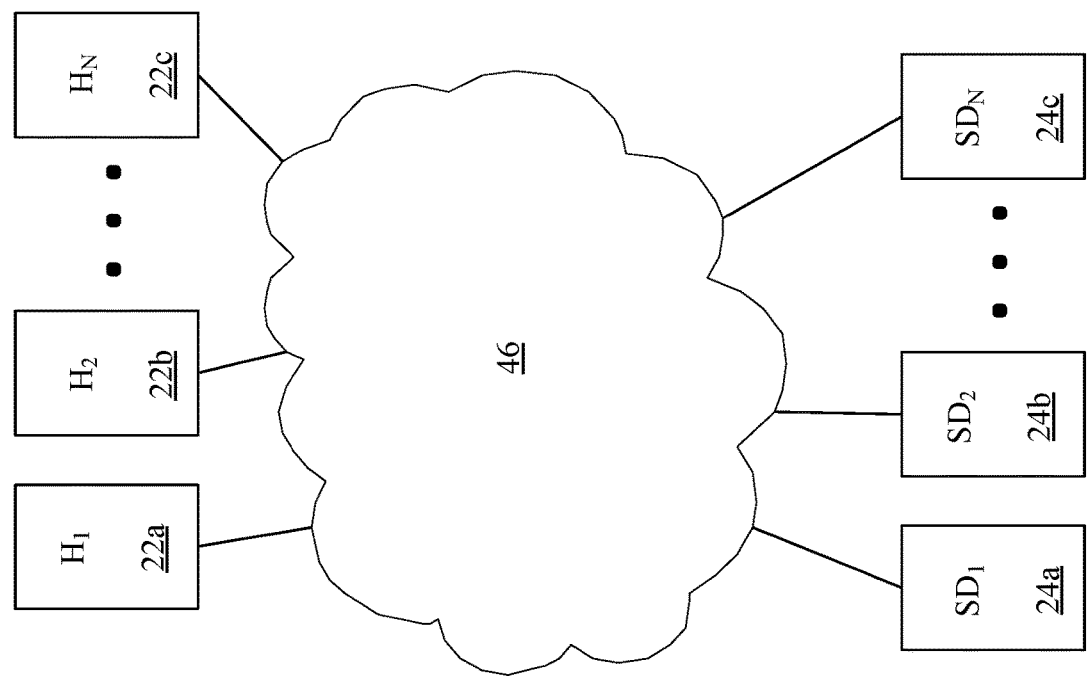
FIG. 3 is a schematic illustration showing a storage area network (SAN) providing a SAN fabric coupling a plurality of host systems to a plurality of storage systems that may be used in connection with an embodiment of the system described herein.

FIG. 3 is a schematic illustration showing a storage area network (SAN) 46 providing a SAN fabric coupling a plurality of host systems ($H_1$-$H_N$) 22a-c to a plurality of storage systems ($SD_1$-$SD_N$) 24a-c that may be used in connection with an embodiment of the system described herein. Each of the devices 22a-c, 24a-c may have a corresponding port that is physically coupled to switches of the SAN fabric used to implement the storage area network 60. The switches may be separately programmed by one of the devices 22a-c, 24a-c or by a different device (not shown). Programming the switches may include setting up specific zones that describe allowable data-path connections (which ports may form a data-path connection) and possible allowable initiator ports of those configurations. For example, there may be a zone for connecting the port of the host 22a with the port of the storage system 24a. Upon becoming activated (e.g., powering up), the host 22a and the storage system 24a may send appropriate signals to the switch(es) of the storage area network 60, and each other, which then allows the host 22a to initiate a data-path connection between the port of the host 22a and the port of the storage system 24a. Zones may be defined in terms of a unique identifier associated with each of the ports, such as such as a world-wide port name (WWPN).

Figure 4:
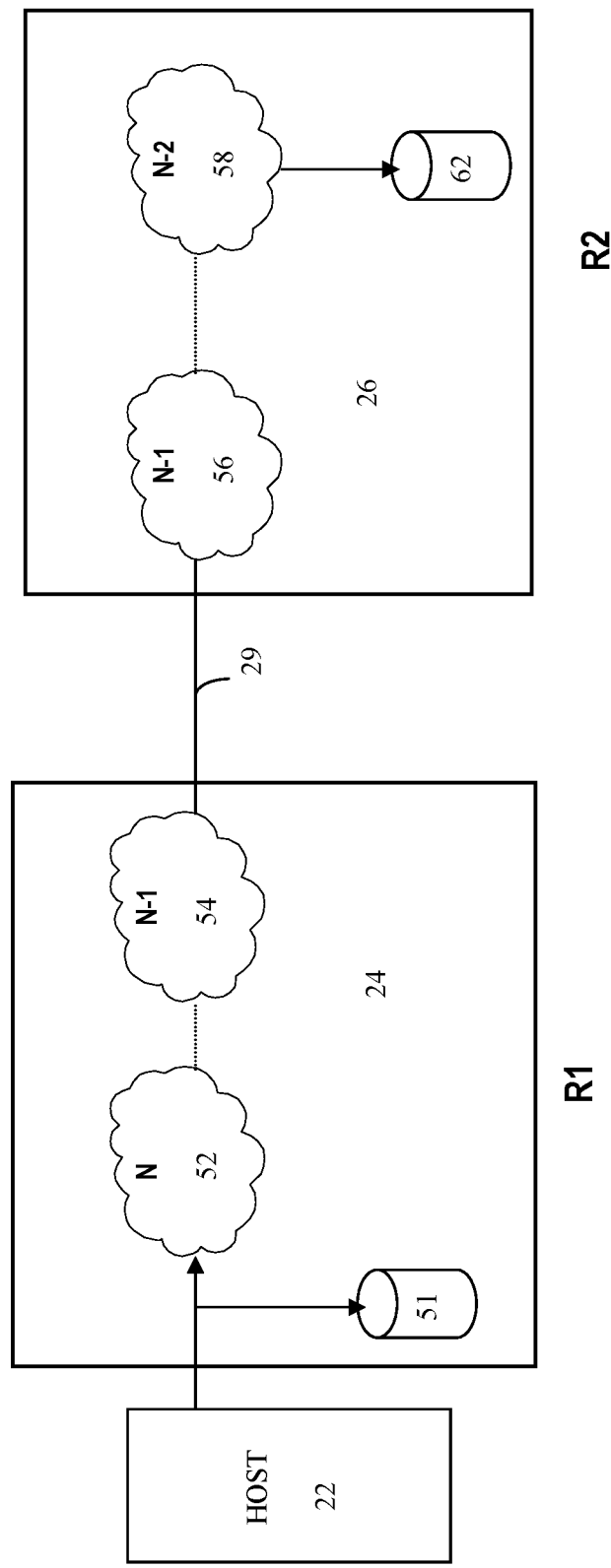
FIG. 4 is a schematic diagram showing a flow of data between a host, a local storage system, and a remote storage system used in connection with an embodiment of the system described herein.

Referring to FIG. 4, a path of data is illustrated from the host 22 to the local storage system 24 and the remote storage system 26 where data is replicated asynchronously from the local storage system 24 to the remote storage system 26. Data written from the host 22 to the local storage system 24 is stored locally, as illustrated by the data element 51 of the local storage system 24. The data that is written by the host 22 to the local storage system 24 is also maintained by the local storage system 24 in connection with being sent by the local storage system 24 to the remote storage system 26 via the link 29.

In the system described herein, each data write by the host 22 (of, for example a record, a plurality of records, a track, etc.) is assigned a sequence number. The sequence number may be provided in an appropriate data field associated with the write. In FIG. 4, the writes by the host 22 are shown as being assigned sequence number N. All of the writes performed by the host 22 that are assigned sequence number N are collected in a single chunk of data 52. The chunk 52 represents a plurality of separate writes by the host 22 that occur at approximately the same time.

Generally, the local storage system 24 accumulates chunks of one sequence number while transmitting a previously accumulated chunk (having the previous sequence number) to the remote storage system 26. Thus, while the local storage system 24 is accumulating writes from the host 22 that are assigned sequence number N, the writes that occurred for the previous sequence number (N−1) are transmitted by the local storage system 24 to the remote storage system 26 via the link 29. A chunk 54 represents writes from the host 22 that were assigned the sequence number N−1 that have not been transmitted yet to the remote storage system 26.

The remote storage system 26 receives the data from the chunk 54 corresponding to writes assigned a sequence number N−1 and constructs a new chunk 56 of host writes having sequence number N−1. The data may be transmitted using appropriate protocol (e.g., RDF protocol) that acknowledges data sent across the link 29. When the remote storage system 26 has received all of the data from the chunk 54, the local storage system 24 sends a commit message to the remote storage system 26 to commit all the data assigned the N−1 sequence number corresponding to the chunk 56. Generally, once a chunk corresponding to a particular sequence number is committed, that chunk may be written to a LUN. This is illustrated in FIG. 4 with a chunk 58 corresponding to writes assigned sequence number N−2 (i.e., two before the current sequence number being used in connection with writes by the host 22 to the local storage system 26). In FIG. 4, the chunk 58 is shown as being written to a data element 62 representing non-volatile storage for the remote storage system 26. Thus, the remote storage system 26 is receiving and accumulating the chunk 56 corresponding to sequence number N−1 while the chunk 58 corresponding to the previous sequence number (N−2) is being written to non-volatile storage of the remote storage system 26 illustrated by the data element 62. In some embodiments, the data for the chunk 58 is marked for write (but not necessarily written immediately), while the data for the chunk 56 is not.

Thus, in operation, the host 22 writes data to the local storage system 24 that is stored locally in the data element 51 and is accumulated in the chunk 52. Once all of the data for a particular sequence number has been accumulated (described elsewhere herein), the local storage system 24 increments the sequence number. Data from the chunk 54 corresponding to one less than the current sequence number is transferred from the local storage system 24 to the remote storage system 26 via the link 29. The chunk 58 corresponds to data for a sequence number that was committed by the local storage system 24 sending a message to the remote storage system 26. Data from the chunk 58 is written to disk storage of the remote storage system 26.

Note that the writes within a particular one of the chunks 52, 54, 56, 58 are not necessarily ordered. However, every write for the chunk 58 corresponding to sequence number N−2 was begun prior to beginning any of the writes for the chunks 54, 56 corresponding to sequence number N−1. In addition, every write for the chunks 54, 56 corresponding to sequence number N−1 was begun prior to beginning any of the writes for the chunk 52 corresponding to sequence number N. Thus, in the event of a communication failure between the local storage system 24 and the remote storage system 26, the remote storage system 26 may simply finish writing the last committed chunk of data (the chunk 58 in the example of FIG. 4) and can be assured that the state of the data at the remote storage system 26 is ordered in the sense that the data element 62 contains all of the writes that were begun prior to a certain point in time and contains no writes that were begun after that point in time. Thus, R2 always contains a consistent point in time copy of R1 and it is possible to reestablish a consistent image from the R2 device. The general mechanism for maintaining a consistent version of data when data is transferred asynchronously is described in U.S. Pat. No. 7,054,883 to Meiri, et al. and titled VIRTUAL ORDERED WRITES FOR MULTIPLE STORAGE DEVICES, which is incorporated by reference herein.

Figure 5A:
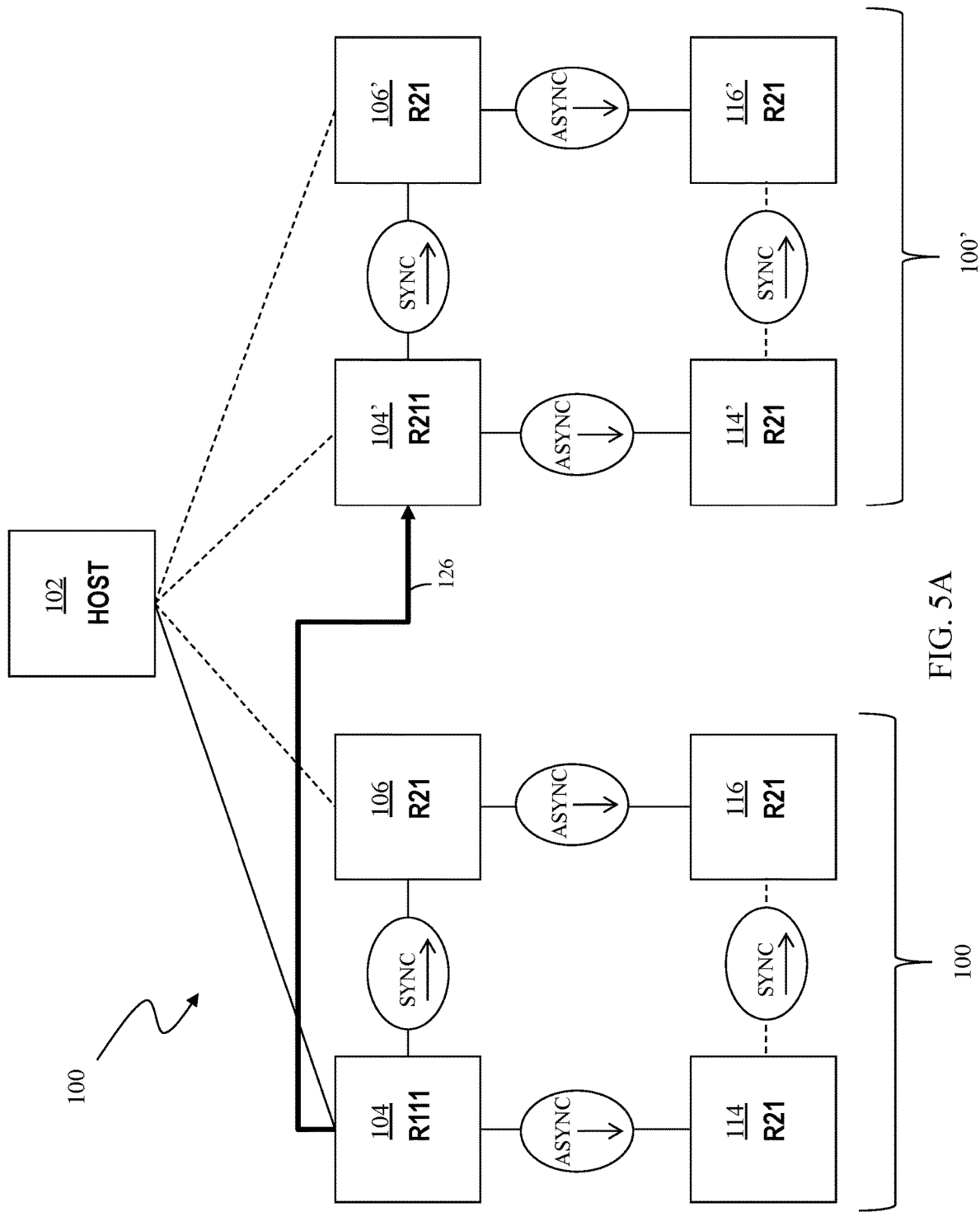
FIG. 5A is schematic illustration showing a donor four site replication system and a target four site replication system during a transition according to an embodiment of the system described herein.

Referring to FIG. 5A, a schematic diagram shows a donor four site replication system 100 and a target four site replication system 100′, both coupled to a host 102 during a transition from using the donor four site replication system 100 to sing the target four site replication system 100′. The donor four site replication system 100 includes a first local storage system (R111) 104, a second local storage system (R21) 106, a first remote storage system (R21) 114, and a second remote storage system (R22) 116. The host 102, which is like the host 22 described elsewhere herein, may access data to perform read and write operations with the first local storage system 104. The first local storage system 104 may communicate synchronously with the second local storage system 106. In an embodiment herein, the first and second local storage systems 104, 106 may be like the storage system 24 described elsewhere herein and may each represent storage systems that are in relatively close proximity to allow for synchronous data mirroring from the first local storage system 104 to the second local storage system 106. The local storage systems 104, 106 may be located in a same data center, same building, or in different buildings in relatively close proximity. The first local storage system 104 may transfer data synchronously to the second local storage system 106 using any appropriate synchronous transfer protocol, such as SRDF/S provided by Dell EMC of Hopkinton, Mass.

The first local storage system 104 may asynchronously replicate data to the first remote storage system 114. Similarly, the second local storage system 106 may asynchronously replicate data to the second remote storage system 116. The asynchronous replication may provide consistent data sets using, for example, the SRDF/A protocol which is provided by Dell EMC of Hopkinton, Mass. Note also asynchronous data transfer providing consistent data sets that is illustrated in connection with FIG. 4, described in detail elsewhere herein. The remote storage systems 114, 116 may each represent a storage system (e.g., array storage system) and/or a plurality of storage systems at a location that is geographically distant from the local storage systems 104, 106. For example, the remote storage systems 114, 116 may be located on the west coast of the United States while the local storage systems 104, 106 may be located on the east coast of the United States. Because of the relatively large geographic distance between the local storage systems 104, 106 and the remote storage systems 114, 116, it may be impractical to use a synchronous data transfer mode to mirror data on the remote storage systems 114, 116 from the local systems 104, 106. In such instances, asynchronous transfers may be performed according to the system described herein.

After the host 102 has written data to the first local storage system 104 and thus created synchronous local copies on the local storage systems 104, 106, remote replication functionality may be performed to asynchronously transfer copies of the data to the remote storage systems 114, 116. In an embodiment herein, the host 102 includes a mechanism for automatically switching to use the second local storage system, 106 for I/O operations whenever the first local storage system is not operating properly. This is illustrated by the dotted line connecting the host 102 with the second local storage system 106. In an embodiment herein, the host 102 is running the z/OS operating system and automatically switching between using the storage systems 104, 106 may be provided by using a first subchannel set for the first local storage system 104 and using a second, different, subchannel set for the second local storage system 106 and by using software that automatically switches from using the first subchannel set to the second subchannel set, such as the AutoSwap product from Dell EMC of Hopkinton, Mass. Note that, if both of the storage systems 104, 106 stop working, then workloads may be resumed using the remote storage systems 114, 116 and possibly a different host (not shown in FIG. 5A). In such a case, the remote host may perform I/O operations with the first remote storage system 114 and the first remote storage system may activate a synchronously link (using, for example, SRDF/S) to copy data synchronously from the first remote storage system 114 to the second remote storage system 116.

The target four site replication system 100' includes an alternative first local storage system (R111) 104', an alternative second local storage system (R21) 106', an alternative first remote storage system (R21) 114', and an alternative second remote storage system (R22) 116'. The host 102 is coupled to the alternative first local storage system 104', and the alternative second local storage system 106', but does not exchange any data therewith until the transition from the donor four site replication system 100 to the target four site replication system 100', described in more detail elsewhere herein, as completed. In an embodiment where the host 102 is running the z/OS operating system, a first subchannel set (e.g., SS0) may be used for the first local storage system 104, a second subchannel set (e.g., SS1) may be used for the second local storage system 106, a third subchannel set (e.g., SS2) may be used for the alternative first local storage system 104', and a fourth subchannel set (e.g., SS3) may be used for the alternative second local storage system 106'. The alternative first local storage system 104' may communicate synchronously with the alternative second local storage system 106'. The alternative first and second local storage systems 104', 106' may each represent storage systems that are in relatively close proximity to allow for synchronous data mirroring from the alternative first local storage system 104' to the alternative second local storage system 106'. The alternative first local storage system 104' may transfer data synchronously to the alternative second local storage system 106' using any appropriate synchronous transfer protocol, such as SRDF/S provided by Dell EMC of Hopkinton, Mass.

The alternative first local storage system 104' may asynchronously replicate data to the alternative first remote storage system 114'. Similarly, the alternative second local storage system 106' may asynchronously replicate data to the alternative second remote storage system 116'. The asynchronous replication may provide consistent data sets using, for example, the SRDF/A protocol which is provided by Dell EMC of Hopkinton, Mass. Note also that asynchronous data transfer providing consistent data sets that is illustrated in connection with FIG. 4, described in detail elsewhere herein. The alternative remote storage systems 114', 116' may each represent a storage system (e.g., array storage system) and/or a plurality of storage systems at a location that is geographically distant from the alternative local storage systems 104', 106'.

The target four site replication system 100' is essentially functionally equivalent to the donor four site replication system 100. As described in more detail herein, the target four site replication system 100' replaces the donor four site replication system 100. Thus, prior to the transition shown in FIG. 5A, only the donor four site replication system 100 may be present and the target four site replication system 100' is added as part of the transition. Once the target four site replication system 100' has been added, a synchronous data link 126 (e.g., SRDF/S) copies data from the first local storage system 104 to the alternative first local storage system 104'. In other embodiments, the host 102 may be used to copy data from the first local storage system 104 to the alternative first local storage system 104'. Note that operation of the target four site replication system 100' causes data to propagate to other ones of the alternative storage systems 106', 114', 116'. Once all of the data has been copied and the systems 100, 100' enter a steady state in which the data on the first local storage system 104 is identical to data on the alternative first local storage system 104', the transition enters a next stage where a switchover occurs, as described in more detail elsewhere herein.

Figure 5B:
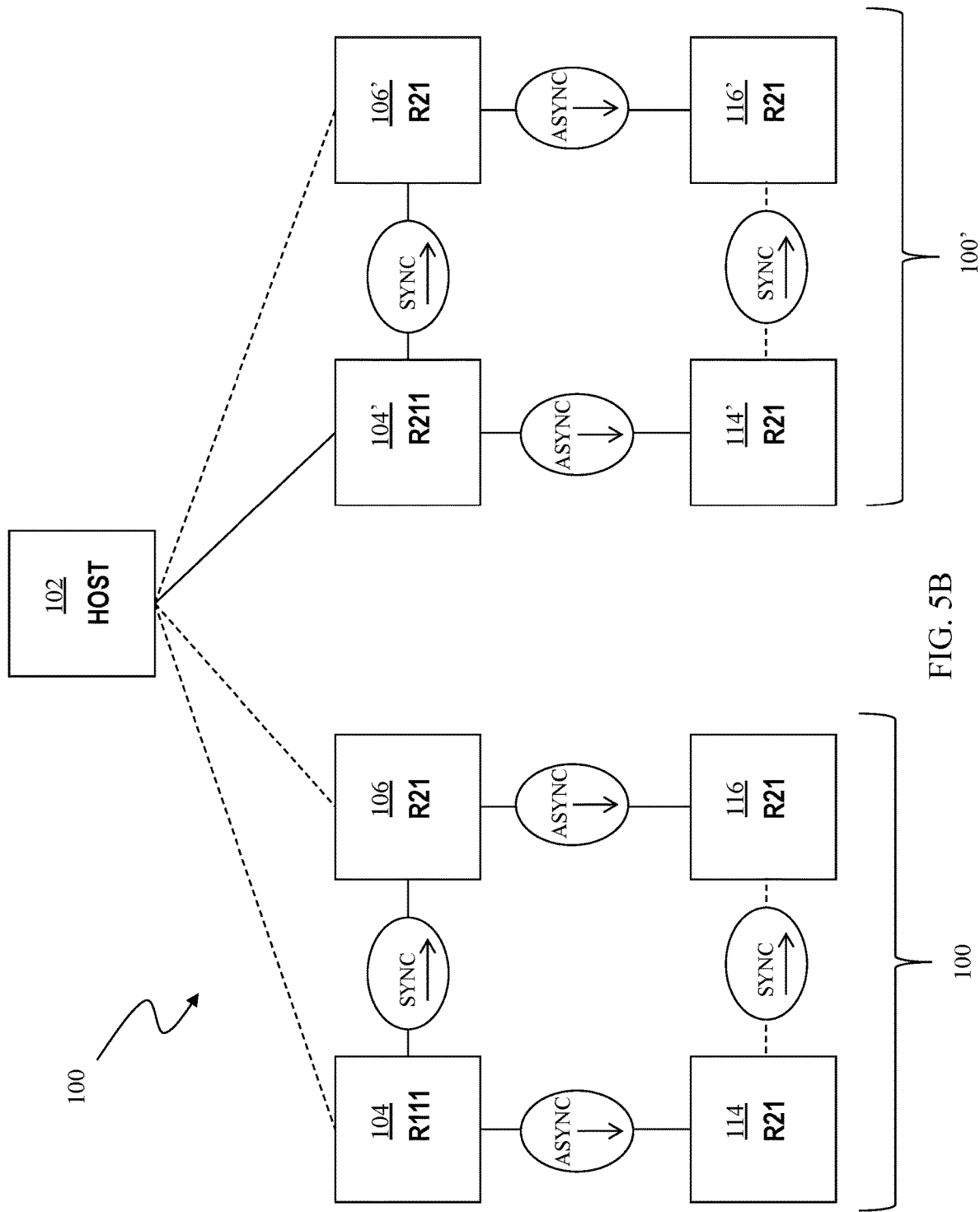
FIG. 5B is schematic illustration showing a donor four site replication system and a target four site replication system following a transition according to an embodiment of the system described herein.

Referring to FIG. 5B, a schematic diagram shows the donor four site replication system 100 and the target four site replication system 100' at a completed stage of the transition where the host 102 performs I/O operations with the alternative first local storage system 104' (solid line). FIG. 5B shows connections maintained between the host 102 and the local storage systems 104, 106, but the connections are optional at this point since the donor four site replication system 100 is no longer participating in I/O operations and may be eliminated altogether. The transition may be performed using a mechanism at the host for switching which storage subsystems are accessed by the host 102. In an embodiment herein, the host 102 is running the z/OS operating system and switching between accessing the storage systems 104, 104' may be provided by switching from using a first subchannel set for the first local storage system 104 to using a second, different, subchannel set for the alternative first local storage system 104'. Such a switch would be transparent to any applications running on the host 102 and would not affect any applications running on the host 102. Concurrent with the switch would be a configuration switch to automatically failover from the alternative first local storage system 104' to the alternative second local storage system 106'. In an embodiment herein, this may be provided by reconfiguring an automatic switching mechanism, such as reconfiguring the AutoSwap product from Dell EMC of Hopkinton, Mass., to automatically switch between subchannels of the host 102.

Thus, the system described herein transitions from using the donor four site replication system 100 to using the target four site replication system 100' without disrupting operation of the host 102; the switchover is transparent to operations running on the host 102 and does not require any suspension of I/O operations. Moreover, protection from loss of service due to failure is provided at all time before, during, and after the transition by either the donor four site replication system 100 or by the target four site replication system 100'. Thus, even if a failure of any of the storage systems 104, 106, 114, 116, 104', 106', 114', 116' occurs during the transition, the host 102 will continue to properly access data without any interruption of service.

In some embodiments, the subchannel sets may be numbered and it may be necessary for at least one of the subchannel sets to have the number zero. In such a case, if one of the donor subchannels sets used the number zero, it is possible to renumber an unused one of the alternative local storage systems 104', 106' to have the number zero.

Figure 6:
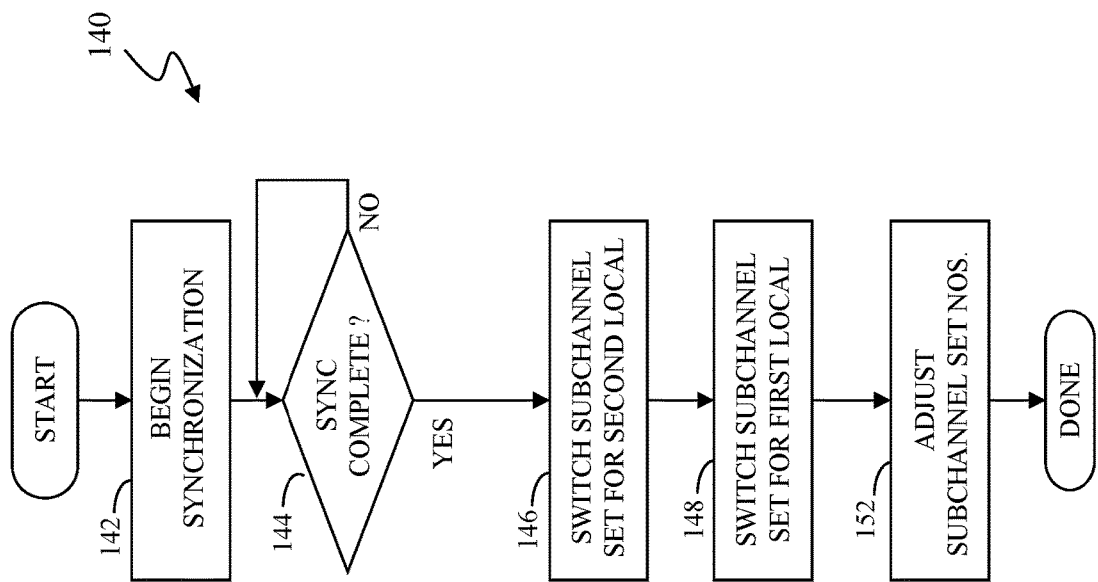
FIG. 6 is a flow diagram illustrating processing performed in connection with transitioning from a donor four site replication system to a target four site replication system according to embodiments of the system described herein.

Referring to FIG. 6, a flow diagram 140 illustrates processing performed in connection with transitioning from using the donor four site replication system 100 to using the target four site replication system 100'. Processing begins at a first step 142 where data synchronization between the first local storage system 104 to the alternative first local storage system 104' is initiated (i.e., the data transfer using the link 126, described above). Following the step 142 is a test step 144 where it is determined if the synchronization is complete. If not, then control transfers back to the test step 144. Otherwise, control transfers from the test step 144 to a step 146 where the host 102 switches to using the alternative second local storage system 106' for automatic failover if the local storage system 104 fails. Following the step 146 is a step 148 where the host 102 switches to using the alternative first local storage system 104' for I/O operations with the host 102. Following the step 148 is a step 152 where the host 102 adjusts subchannel set numbers, as described elsewhere herein, if necessary. Following the step 152, processing is complete.

As an alternative to what is shown in the steps 146, 148, it may be possible instead to make both transitions at the same time. That is, it may be possible to configure the alternative second local storage system 106' to be the failover system while, at the same time, cause the host to perform I/O operations with the alternative first local storage system 104'. As another alternative, it would be possible to first configure the alternative first local storage system 104' to be the failover system (for the first local storage system 104) and then, in a following step, simultaneously reconfigure the alternative second local storage system 106' to be the failover system while, at the same time, cause the host to perform I/O operations with the alternative first local storage system 104'.

Various embodiments discussed herein may be combined with each other in appropriate combinations in connection with the system described herein. Additionally, in some instances, the order of steps in the flow diagrams, flowcharts and/or described flow processing may be modified, where appropriate. Further, various aspects of the system described herein may be implemented using software, hardware, a combination of software and hardware and/or other computer-implemented modules or devices having the described features and performing the described functions. The system may further include a display and/or other computer components for providing a suitable interface with a user and/or with other computers.

Software implementations of the system described herein may include executable code that is stored in a non-transitory computer-readable medium and executed by one or more processors. The computer-readable medium may include volatile memory and/or non-volatile memory, and may include, for example, a computer hard drive, ROM, RAM, flash memory, portable computer storage media such as a CD-ROM, a DVD-ROM, an SD card, a flash drive or other drive with, for example, a universal serial bus (USB) interface, and/or any other appropriate tangible or non-transitory computer-readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of transitioning from using a donor four site replication system to using a target four site replication system, comprising:

initiating synchronization between a first local storage system of the donor four site replication system that receives I/O from a host with an alternative first local storage system of the target four site replication system;

the host switching to automatically fail over to a synchronous storage system of the target four site replication system that receives synchronous data from the alternative first local storage system following synchronizing the first local storage system with the alternative first local storage system; and the host switching to perform I/O operations with the alternative first local storage system following switching to automatically fail over to the synchronous storage system.

2. A method, according to claim 1, wherein the host runs the z/OS operating system.

3. A method, according to claim 2, wherein the host automatically fails over to a storage system by switching subchannel sets.

4. A method, according to claim 2, wherein the host switches to perform I/O operations with the alternative first local storage system by switching subchannel sets.

5. A method, according to claim 1, wherein, prior to the host switching to automatically fail over to the synchronous storage system, the host is configured to automatically fail over to a second local storage system of the donor target replication system.

6. A method, according to claim 5, wherein the second local storage system receives synchronous data from the first local storage system.

7. A method, according to claim 6, wherein a first remote storage system receives asynchronous data from the first local storage system and a second remote storage system receives asynchronous data from the second local storage system.

8. A method, according to claim 7, wherein asynchronous data is provided using an SRDF/A protocol.

9. A method, according to claim 1, wherein an alternative first remote storage system receives asynchronous data from the alternative first local storage system.

10. A method, according to claim 9, wherein asynchronous data is provided using an SRDF/A protocol.

11. A non-transitory computer readable medium containing software that transitions from using a donor four site replication system to using a target four site replication system, the software comprising:

executable code that initiates synchronization between a first local storage system of the donor four site replication system that receives I/O from a host with an alternative first local storage system of the target four site replication system;

executable code that switches the host to automatically fail over to a synchronous storage system of the target four site replication system that receives synchronous data from the alternative first local storage system following synchronizing the first local storage system with the alternative first local storage system; and executable code that switches the host to perform I/O operations with the alternative first local storage system following switching to automatically fail over to the synchronous storage system.

12. A non-transitory computer readable medium, according to claim 11, wherein the host runs the z/OS operating system.

13. A non-transitory computer readable medium, according to claim 12, wherein the host automatically fails over to a storage system by switching subchannel sets.

14. A non-transitory computer readable medium, according to claim 12, wherein the host switches to perform I/O operations with the alternative first local storage system by switching subchannel sets.

15. A non-transitory computer readable medium, according to claim 11, wherein, prior to the host switching to automatically fail over to the synchronous storage system, the host is configured to automatically fail over to a second local storage system of the donor target replication system.

16. A non-transitory computer readable medium, according to claim 15, wherein the second local storage system receives synchronous data from the first local storage system.

17. A non-transitory computer readable medium, according to claim 16, wherein a first remote storage system receives asynchronous data from the first local storage system and a second remote storage system receives asynchronous data from the second local storage system.

18. A non-transitory computer readable medium, according to claim 17, wherein asynchronous data is provided using an SRDF/A protocol.

19. A non-transitory computer readable medium, according to claim 11, wherein an alternative first remote storage system receives asynchronous data from the alternative first local storage system.

20. A non-transitory computer readable medium, according to claim 19, wherein asynchronous data is provided using an SRDF/A protocol.

\* \* \* \* \*